(12) United States Patent
Sako et al.

(10) Patent No.: US 7,448,086 B2
(45) Date of Patent: Nov. 4, 2008

(54) RECORDING APPARATUS AND METHOD, REPRODUCING APPARATUS AND METHOD, AND MEMORY MEDIUM

(75) Inventors: Yoichiro Sako, Tokyo (JP); Tatsuya Inokuchi, Tokyo (JP); Shunsuke Furukawa, Tokyo (JP); Takashi Kihara, Chiba (JP)

(73) Assignee: Sony Corporation, Tokyo (JP)

( * ) Notice: Subject to any disclaimer, the term of this patent is extended or adjusted under 35 U.S.C. 154(b) by 923 days.

(21) Appl. No.: 10/169,695

(22) PCT Filed: Nov. 2, 2001

(86) PCT No.: PCT/JP01/09625

§ 371 (c)(1),
(2), (4) Date: Jul. 3, 2002

(87) PCT Pub. No.: WO02/37494

PCT Pub. Date: May 10, 2002

(65) Prior Publication Data

US 2003/0012375 A1    Jan. 16, 2003

(30) Foreign Application Priority Data

Nov. 6, 2000  (JP) ............................. 2000-337308

(51) Int. Cl.
*H04L 9/14*   (2006.01)
(52) U.S. Cl. ........................... 726/27; 726/26; 726/30; 713/189; 713/193; 369/47.12; 369/84; 369/275.3
(58) Field of Classification Search ................. 713/189, 713/193; 380/277, 200, 228, 230; 369/275.3, 369/47.12, 84; 726/26–27, 31, 30; 361/26.01, 361/47.1, 47.12
See application file for complete search history.

(56) References Cited

U.S. PATENT DOCUMENTS 5,666,238 A * 9/1997 Igari et al. ............... 360/77.08
5,926,453 A * 7/1999 Muramatsu et al. ...... 369/275.4
6,108,296 A * 8/2000 Kajiyama et al. ........ 369/275.4

(Continued)

FOREIGN PATENT DOCUMENTS

EP          0 851 418          7/1998

(Continued)

*Primary Examiner*—Christian Laforgia
*Assistant Examiner*—Yin-Chen Shaw
(74) *Attorney, Agent, or Firm*—Finnegan, Henderson, Farabow, Garrett & Dunner, L.L.P.

(57) ABSTRACT

Data areas AR1 and AR2, lead-in areas LIN1 and LIN2, and lead-out areas LOUT1 and LOUT2 are provided on a disc. For example, in case of encrypting and recording data into the data area AR2, copyright management information R2 and key information K2 are recorded into the lead-out area LOUT2. Only information in a Q channel of a subcode is recorded in the lead-out area and this area is filled with dummy data. A position of the lead-out is obtained from TOC information. The fact that a light spot has entered the lead-out area can be judged from the information in the Q channel. The copyright management information and key information are recorded by using the lead-out area. The lead-out area is not rewritten or accessed by an ordinary CD player, so that the copyright management information and the key information can be safely held.

6 Claims, 9 Drawing Sheets

U.S. PATENT DOCUMENTS

| | | | |
|---|---|---|---|
| 6,178,057 B1 * | 1/2001 | Kuroda et al. | 360/51 |
| 6,289,102 B1 * | 9/2001 | Ueda et al. | 380/201 |
| 6,577,811 B1 * | 6/2003 | Kikuchi et al. | 386/98 |
| 6,584,552 B1 * | 6/2003 | Kuno et al. | 711/163 |
| 6,615,192 B1 * | 9/2003 | Tagawa et al. | 705/57 |
| 6,707,784 B2 * | 3/2004 | Sako et al. | 369/275.3 |
| 6,772,284 B2 * | 8/2004 | Ikeda | 711/113 |
| 6,938,162 B1 * | 8/2005 | Nagai et al. | 713/189 |
| 6,973,015 B1 * | 12/2005 | Murakami et al. | 369/47.21 |

FOREIGN PATENT DOCUMENTS

| | | |
|---|---|---|
| EP | 0 933 776 | 8/1999 |
| EP | 0 989 553 | 3/2000 |
| EP | 1 001 419 | 5/2000 |
| EP | 0 899 733 | 3/2001 |
| JP | 60-119670 | 6/1985 |
| JP | 7-169187 | 7/1995 |
| JP | 9-128301 | 5/1997 |
| JP | 10-106147 | 4/1998 |
| JP | 11-328867 | 11/1999 |
| WO | WO 95 12200 | 5/1995 |

* cited by examiner

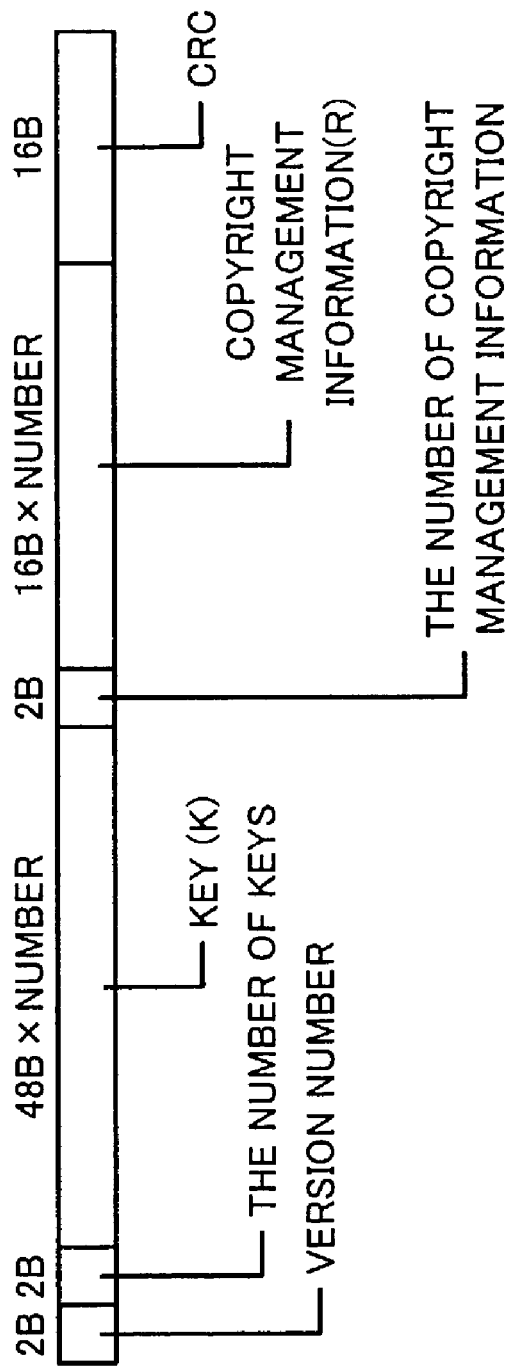

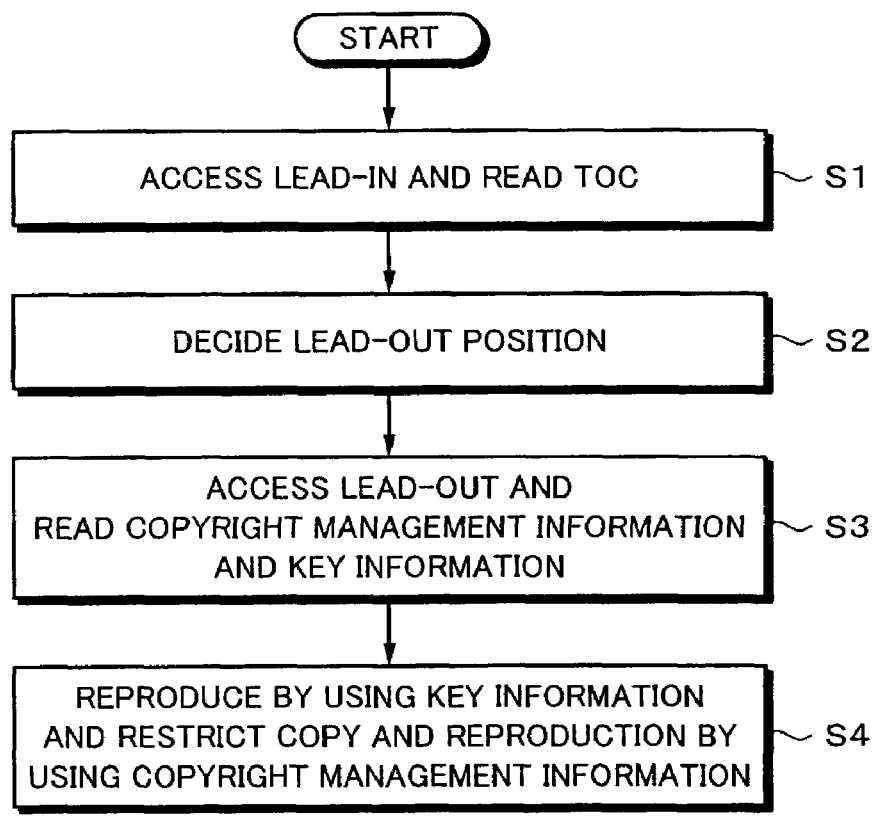

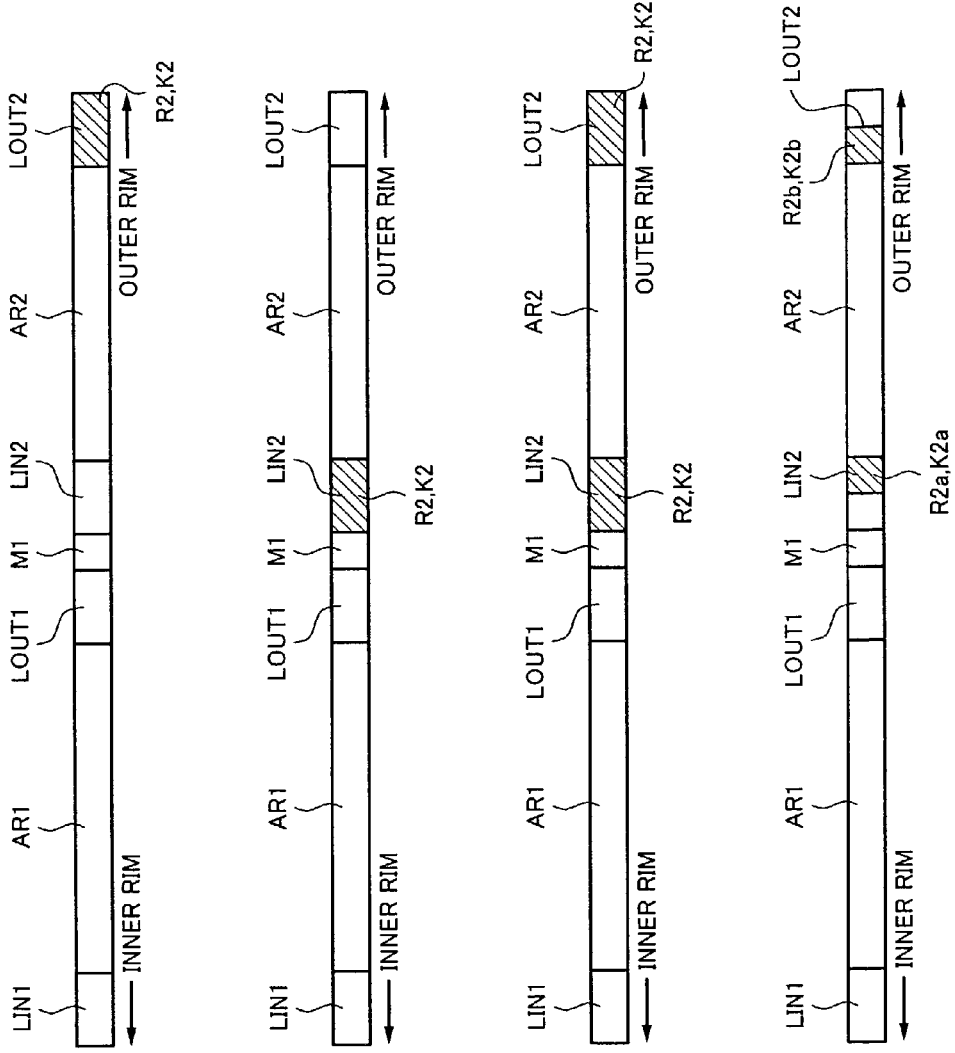

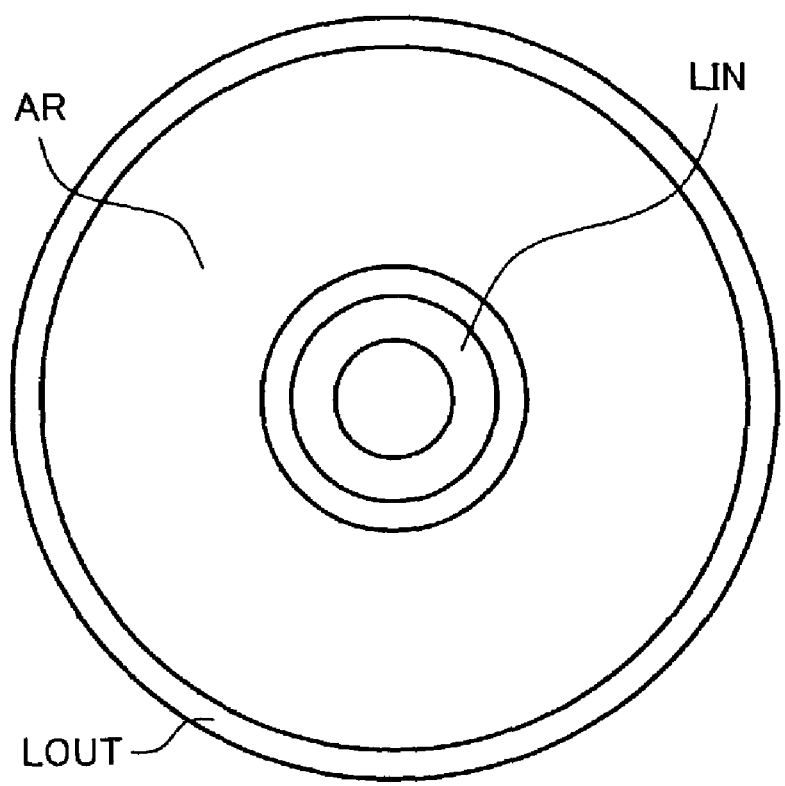

RECORDING APPARATUS AND METHOD, REPRODUCING APPARATUS AND METHOD, AND MEMORY MEDIUM

TECHNICAL FIELD

The invention relates to recording apparatus and method, reproducing apparatus and method, and a memory medium which are suitable for use in a case where when data of contents is recorded/reproduced to/from a disc such as a CD (Compact Disc) 2, the data is encrypted in order to protect the contents data.

BACKGROUND ART

In recent years, data of contents can be easily copied owing to the spread of a recordable memory medium such as CD-R (Compact Disc Recordable) or CD-RW (Compact Disc ReWritable). A service such that music data is distributed onto a network has been started to spread owing to the development of the network. Therefore, it is becoming an important issue to protect a copyright holder by restricting copy and reproduction of contents data such as audio data.

Hitherto, an SCMS (Serial Copy Management System) has been used as copyright management information for protecting audio data. In the SCMS, "copy freely"/"copy never" and "copy one generation" can be managed. However, if only the SCMS is used, only simple copyright management such that an illegal copy is merely prevented can be made.

Therefore, copyright management information in a complicated format such that restriction of the number of copies, restriction of the number of reproducing times, restriction of a reproducing time, charge, or the like can be performed is necessary. If the copyright management information such that the restriction of the number of copies, the restriction of the number of reproducing times, the restriction of a reproducing time, the charge, or the like can be performed is used, a music piece can be reproduced only the predetermined number of times or only for a predetermined period of time in order to be monitored. It is possible to execute services in various forms such that if the music piece is charged for, the music piece can be always listened to, the music piece is charged for in accordance with the number of reproducing times or a reproducing time, and the like.

If such services are started, it is necessary to encrypt the contents data so as to enable desired music pieces among music pieces stored in a memory medium to be listened to the predetermined number of reproducing times or for a predetermined period of time or enable only the user who has been charged to listen to the music pieces. It is also necessary to encrypt the contents data in order to prevent an illegal copy from being frequently performed. For this purpose, key information to decrypt the encryption is necessary.

As mentioned above, in case of selling or distributing the contents data such as audio data, the copyright management information and the key information which is used for decrypting the encryption are necessary. Since the copyright management information or key information has a size of at most about 256 kbits, it hardly becomes a burden on a memory capacity. However, it is necessary to take security into consideration lest the copyright management information or key information leaks to the outside or is easily rewritten.

If the copyright management information and the key information which is used for decrypting the encryption are inserted into a main data area together with the contents data, a data capacity for which the contents data can be recorded is reduced by an amount corresponding thereto, and there is also a possibility that the copyright management information or the encryption information leaks to the outside and is rewritten, so that there is a problem on the security.

In the case where the memory medium is, for example, a CD, there is a method whereby the copyright management information or the encryption information is inserted into a subcode. However, defined information has already been inserted in the subcode. There is also a case where data of the subcode is rewritten each time the disc is edited.

It is, therefore, an object of the invention to provide recording apparatus and method, reproducing apparatus and method, and a memory medium storage, in which copyright information and key information can be safely stored and they do not become a burden on a data capacity.

DISCLOSURE OF INVENTION

According to the present invention, there is provided a recording apparatus comprising: input means for inputting encryption data; and recording means for recording the encryption data which is inputted into a data area on a memory medium having the data area, a lead-in area, and a lead-out area and recording additional information corresponding to the encryption data into the lead-out area.

According to the present invention, there is provided a recording apparatus comprising: input means for inputting encryption data; and recording means for recording the encryption data which is inputted into data areas on a memory medium having the plurality of data areas, a plurality of lead-in areas, and a plurality of lead-out areas and recording additional information corresponding to the encryption data into one of the plurality of lead-in areas or one of the plurality of lead-out areas.

According to the present invention, there is provided a reproducing apparatus comprising: reading means for reading out stored encryption data from a data area on a memory medium having the data area, a lead-in area, and a lead-out area and reading out additional information stored in the lead-out area; and reproducing means for reproducing the encryption data in accordance with the read-out additional information.

According to the present invention, there is provided a reproducing apparatus comprising: reading means for reading out encryption data from one of a plurality of data areas on a memory medium having the plurality of data areas, a plurality of lead-in areas, and a plurality of lead-out areas and reading out additional information corresponding to the encryption data from one of the plurality of lead-in areas or one of the plurality of lead-out areas; and reproducing means for reproducing the encryption data in accordance with the read-out additional information.

According to the present invention, there is provided a recording method comprising the steps of: inputting encryption data; recording the encryption data which is inputted into a data area on a memory medium having the data area, a lead-in area, and a lead-out area; and recording additional information corresponding to the encryption data into the lead-out area.

According to the present invention, there is provided a recording method comprising the steps of: inputting encryption data; recording the encryption data which is inputted into data areas on a memory medium having the plurality of data areas, a plurality of lead-in areas, and a plurality of lead-out areas; and recording additional information corresponding to the encryption data into one of the plurality of lead-in areas or one of the plurality of lead-out areas.

According to the present invention, there is provided a reproducing method comprising the steps of: reading out stored encryption data from a data area on a memory medium having the data area, a lead-in area, and a lead-out area; reading out additional information stored in the lead-out area; and reproducing the encryption data in accordance with the read-out additional information.

According to the present invention, there is provided a reproducing method comprising the steps of: reading out encryption data from one of a plurality of data areas on a memory medium having the plurality of data areas, a plurality of lead-in areas, and a plurality of lead-out areas; reading out additional information corresponding to the encryption data from one of the plurality of lead-in areas or one of the plurality of lead-out areas; and reproducing the encryption data in accordance with the read-out additional information.

According to the invention, there is provided a memory medium which has a data area, a lead-in area, and a lead-out area and in which encryption data is recorded into the data area and additional information corresponding to the encryption data is recorded into the lead-out area.

According to the invention, there is provided a memory medium which has a plurality of data areas, a plurality of lead-in areas, and a plurality of lead-out areas and in which encryption data which is inputted to the data areas is recorded and additional information corresponding to the encryption data is recorded into one of the plurality of lead-in areas or one of the plurality of lead-out areas.

When the encryption data is recorded into the data area on the memory medium having the data area, lead-in area, and lead-out area, copyright management information and key information for the encryption data are recorded into the lead-out area.

In case of a memory medium having a plurality of data areas, a plurality of lead-in areas, and a plurality of lead-out areas like CD2, when the encryption data is recorded into the data area, the copyright management information and key information corresponding to the encryption data are recorded into one of the plurality of lead-in areas or lead-out areas.

In a present situation, only information in the Q channel of the subcode has been recorded in the lead-out area and this area is filled with dummy data. The position of the lead-out area is obtained from information of a TOC. The fact that a light spot has entered the lead-out area can be judged from the information in the Q channel. The copyright management information and the key information are recorded by using such a lead-out area. The lead-out area is not rewritten or accessed by an ordinary CD player, so that the copyright management information and the key information can be safely held.

BRIEF DESCRIPTION OF DRAWINGS

FIG. 4 is a schematic diagram of an example of a recording format of copyright management information and key information;

FIG. 5 is a flowchart for use in explanation of the reproducing apparatus to which the invention is applied;

FIGS. 6A to 6D are schematic diagrams for use in explanation of an embodiment of the invention;

FIG. 8 is a schematic diagram of another example of a disc to which the invention is applied.

BEST MODE FOR CARRYING OUT THE INVENTION

An embodiment of the invention will be described hereinbelow with reference to the drawings. The invention is suitable, for example, when it is used for encrypting data of contents and protecting the data when the contents data is recorded/reproduced to/from CD2.

Figure 1:
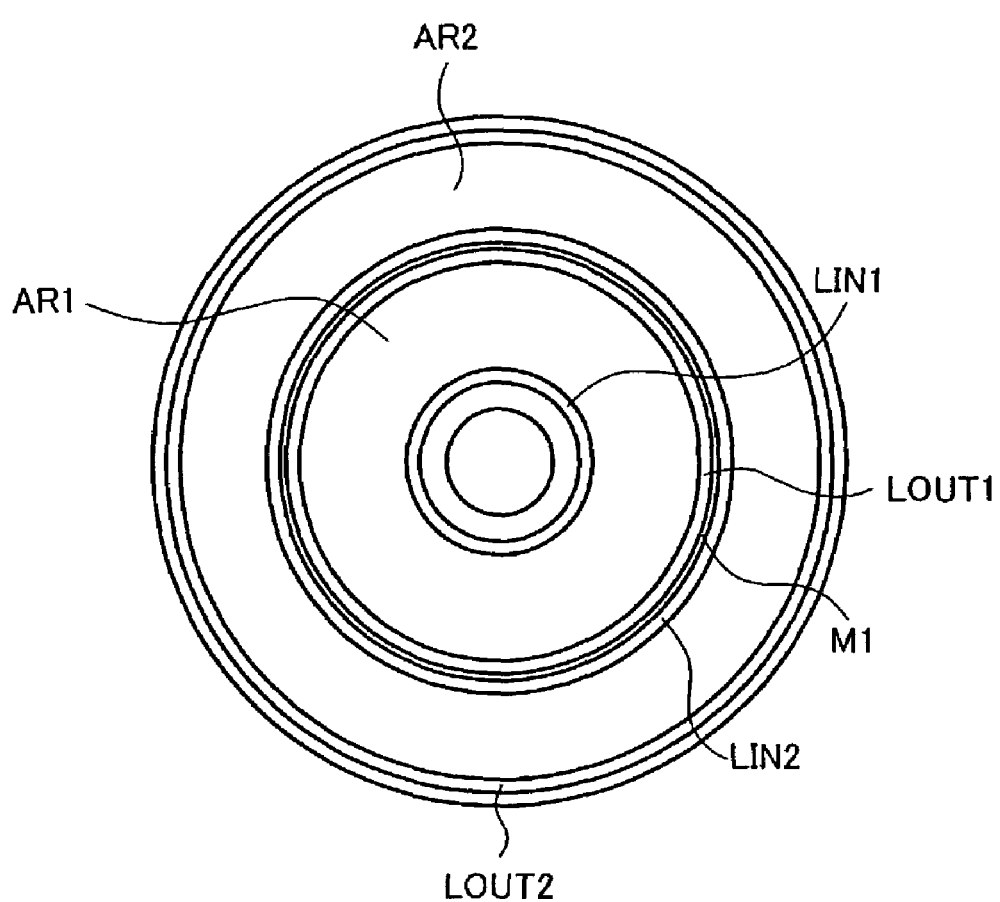
FIG. 1 is a schematic diagram of an example of a disc to which the invention is applied.

CD2 is an optical disc having a shape similar to that of the ordinary CD and is separated into an area AR1 on the inner rim side and an area AR2 on the outer rim side as shown in FIG. 1. A mirror portion M1 is provided between the area AR1 on the inner rim side and the area AR2 on the outer rim side. A lead-in area LIN1 is provided in the innermost rim of the area AR1 on the inner rim side and a lead-out area LOUT1 is provided in the outermost rim. A lead-in area LIN2 is provided in the innermost rim of the area AR2 on the outer rim side and a lead-out area LOUT2 is provided in the outermost rim.

For example, music data is recorded as PCM data as it is into the area AR1 on the inner rim side so that it can be reproduced even by an ordinary CD player. In the area AR1 on the inner rim side, usually, encryption is not executed either.

On the other hand, in the area AR2 on the outer rim side, for example, music data is compressed by Mp3 (MPEG1 Audio Layer-3) or the like and recorded so that data can be recorded at a double density and affinity with a personal computer can be obtained. By compressing the music data by Mp3 or the like and recording it, a recording capacity can be increased and the data can be handled by a file system similar to that of the personal computer. In the area AR2 on the outer rim side, since the data is often taken out to the outside, the data is encrypted and recorded.

As mentioned above, CD2 can be reproduced by the CD player by using the area AR1 on the inner rim side in a manner similar to the ordinary CD. By using the area AR2 on the outer rim side, the data can be handled in an interlocking relational manner with the personal computer.

In such CD2, particularly, the invention is suitable for use in case of encrypting data of contents when the contents data is encrypted and recorded/reproduced to/from the area AR2 on the outer rim side.

Figure 2:
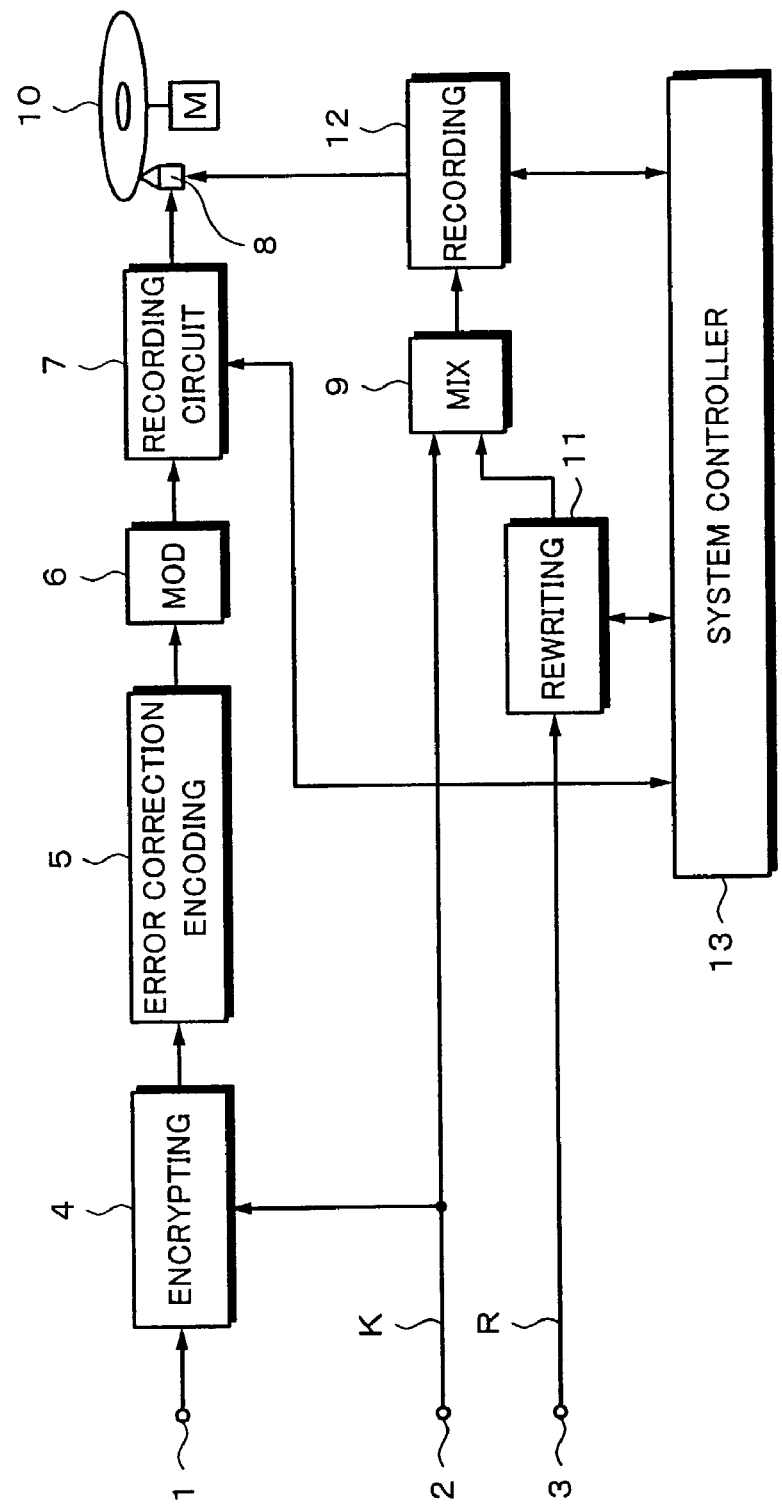
FIG. 2 is a block diagram of an example of a recording apparatus to which the invention is applied.

FIG. 2 shows an example of a recording apparatus to which the invention is applied. In FIG. 2, the contents data is supplied to an input terminal 1. For example, the contents data is audio data (music data). A construction such that besides the audio data, various data such as motion image data, still image data, program data of games, data of a web page, etc. is recorded as contents data is considered. The contents data from the input terminal 1 is supplied to an encrypting circuit 4.

Key information K is supplied to an input terminal 2. The key information K from the input terminal 2 is supplied to the encrypting circuit 4.

The encrypting circuit 4 encrypts the contents data from the input terminal 1 by using the key information K from the input terminal 2.

An output of the encrypting circuit 4 is supplied to an error correction encoding circuit 5. In the error correction encoding circuit 5, an error correction code is added to the contents data encrypted by the encrypting circuit 4.

An output of the error correction encoding circuit 5 is supplied to a modulating circuit 6. In the modulating circuit 6, the recording data is modulated by a predetermined modulating system. An output of the modulating circuit 6 is supplied to a recording circuit 7.

An output of the recording circuit 7 is supplied to an optical pickup 8. The data is recorded onto a disc 10 by the optical pickup 8. The disc 10 is, for example, a disc of CD2.

The key information K from the input terminal 2 is supplied to a mixing circuit 9. Copyright management information R is supplied to an input terminal 3. The copyright management information R is supplied to the mixing circuit 9 via a rewriting circuit 11. An output of the mixing circuit 9 is supplied to the optical pickup 8 via a recording circuit 12. The key information K and copyright management information R are recorded onto the disc 10 by the optical pickup 8.

The copyright management information R is information for managing, for example, copy inhibition/permission, generation management of the copy, restriction of the number of copies, reproduction inhibition/permission, restriction of the number of reproducing times, restriction of a reproducing time, and the like. In case of performing the generation management of the copy, the restriction of the number of copies, the restriction of the number of reproducing times, or the restriction of the reproducing time, it is necessary to rewrite the copyright management information R each time the copy or reproduction is performed. The rewriting of the copyright management information R is performed by the rewriting circuit 11.

The key information K and copyright management information R are recorded into the lead-out area on the disc 10. That is, the disc 10 is, for example, a disc of CD2. In case of the disc of CD2, as shown in FIG. 1, the contents data is encrypted and recorded into the area AR2. In this case, the key information K and copyright management information R are recorded into the lead-out LOUT2 in the outer rim of the area AR2.

Figure 3:
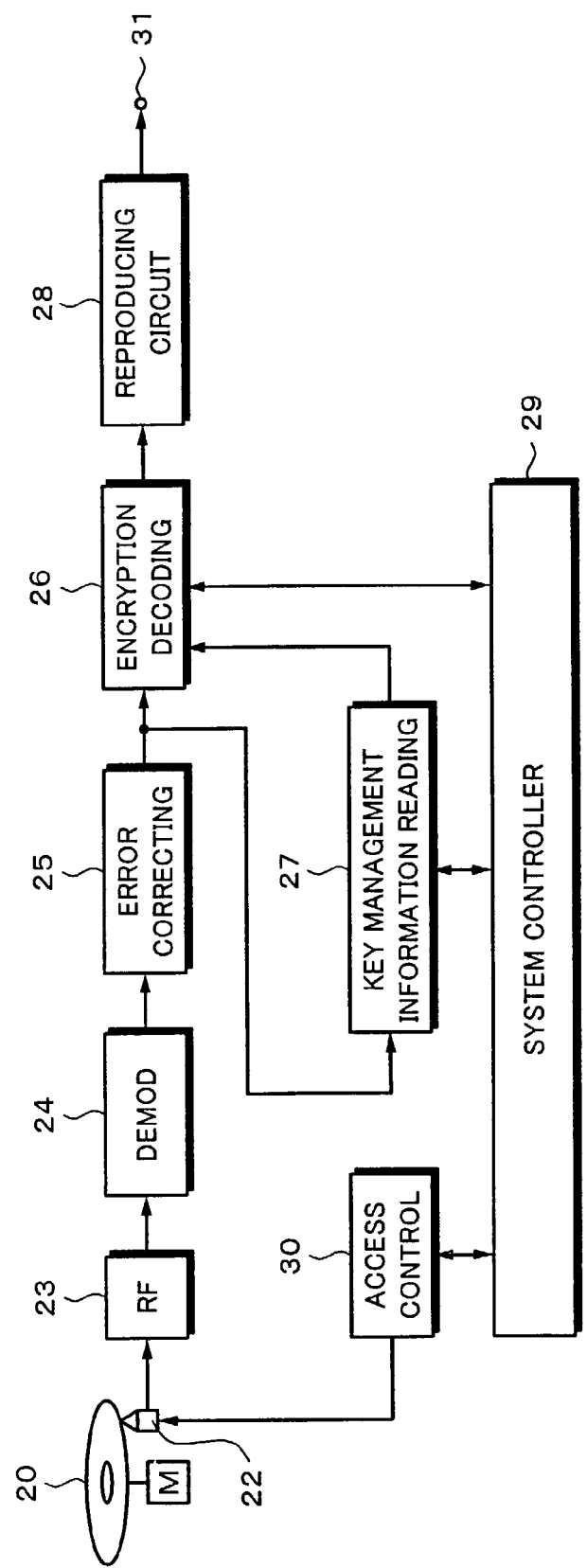
FIG. 3 is a block diagram of an example of a reproducing apparatus to which the invention is applied.

FIG. 3 shows a construction of a reproducing system. In FIG. 3, a recording signal on a disc 20 is reproduced by an optical pickup 22. The disc 20 is, for example, a disc of CD2. An output of the optical pickup 22 is supplied to a demodulating circuit 24 via a reproducing amplifier 23. The motion of the optical pickup 22 is controlled by an access control circuit 30 on the basis of a control of a system controller 29.

As mentioned above, the key information K and the copyright management information R have been recorded into the lead-out area on the disc 20. Therefore, in case of decrypting the data recorded on the disc 20, the optical pickup 22 is moved to the lead-out area by the access control circuit 30. The key information K and the copyright management information R are read out from the lead-out area.

An output of the demodulating circuit 24 is supplied to an error correcting circuit 25. An error correcting process is executed by the error correcting circuit 25. An output of the error correcting circuit 25 is supplied to an encryption decoding circuit 26 and supplied to a key management information reading circuit 27. An output of the key management information reading circuit 27 is supplied to the encryption decoding circuit 26.

The encryption decoding circuit 26 executes a process for decrypting the encryption of the reproduction data by using the key information K read out by the key management information reading circuit 27. The copy or reproduction is restricted by the copyright management information R read out by the key management information reading circuit 27.

An output of the encryption decoding circuit 26 is supplied to a reproducing circuit 28. An output of the reproducing circuit 28 is outputted from an output terminal 31.

As mentioned above, if the discs 10 and 20 are discs of, for example, CD2, the contents data is encrypted and recorded into the recording area AR2 on the outer rim side. The copyright management information R and the key information K at this time are recorded into the lead-out area LOUT2 (FIG. 1) existing in the outer rim of the recording area AR2.

Information indicative of the lead-out has been recorded in the Q channel of the subcode in the lead-out area LOUT2. That is, with respect to track numbers TNO in the Q channel of the subcode, "00" indicates the lead-in, "01" to "99" denote numbers of movements or the like, and "AA" shows the lead-out. Whether the area is the lead-out area LOUT2 or not can be judged from the track number. When a TOC (Table Of Contents) indicates (POINT=2), a time when the lead-out starts is shown. The position of the lead-out is known by it.

Usually, only the information in the Q channel of the subcode is stored in the lead-out area LOUT2 and this area is filled with dummy data. The copyright management information R and the key information K are recorded in place of the dummy data. Therefore, a sufficient area for recording the copyright management information R and the key information K can be held in the lead-out area LOUT2.

FIG. 4 shows an example of a format of recording information in case of recording the copyright management information and the key information.

As shown in FIG. 4, a version number of a key is provided at the head. When the encryption is decrypted, the key is updated to a new key and, at this time, the version number is incremented. Subsequently, information indicative of the number of keys is provided and the key information K of the number as many as the number of keys is provided. Subsequently, the number of copyright management information is provided and the copyright management information R of the number as many as the number of copyright management information is provided. The number of keys or the number of copyright management information corresponds to the number of programs recorded as contents. Lastly, a CRC (Cyclic Redundancy Check) code is added.

An error can be detected by the CRC code and falsification of the copyright management information R or key information K can be prevented. That is, the number of copies and the number of reproducing times are included as copyright management information R. It is presumed that the number of copies or the number of reproducing times is purposely rewritten. If such a rewriting is performed, an error is caused by the CRC code. The falsification of the copyright management information R or the key information K is prevented by this method. A code for authentication can be also recorded in place of the CRC code.

In the ordinary CD player or CD drive for a personal computer, the position of the lead-out area LOUT2 has previously been known from the information of the TOC. The ordinary player does not reproduce the data in the lead-out area LOUT2. Therefore, according to the ordinary CD player or CD drive, the copyright management information R or the key information K of the encryption which have been recorded in the lead-out area LOUT2 is not taken out to the outside. It is considered that even if all of the contents of the disc are copied as they are to another disc by using the ordinary CD player or CD drive, the copyright management information R and the key information K in the lead-out LOUT2 are not copied.

FIG. 5 is a flowchart showing the reproducing operation in the case where the copyright management information R and the key information K are recorded into the lead-out area LOUT2.

First, the lead-in area LIN2 of the area AR2 is accessed and the TOC information is read out from the lead-in area LIN2 (step S1). The position of the lead-out area LOUT2 is judged from the TOC information (step S2). The lead-out area LOUT2 is accessed and the copyright management information R and the key information K are read out of the lead-out area LOUT2 (step S3). The reproduced contents data is decrypted by using the key information K and the copy or reproduction is restricted by using the copyright management information R (step S4).

FIG. 6 schematically shows the data which is recorded onto the disc in the radial direction of the disc. In this example, in the disc on which the recording area AR1 on the inner rim side and the recording area AR2 on the outer rim side are provided, in case of encrypting the contents data in the recording area AR2 on the outer rim side, as shown in FIG. 6A, copyright management information R2 and key information K2 are recorded into the lead-out area LOUT2 existing in the outer rim of the recording area AR2.

As shown in FIG. 6B, the copyright management information R2 and the key information K2 can be also recorded into the lead-in area LIN2. The lead-in area LIN2 is used as an area for recording the TOC and, further, there is a possibility that it is used for recording other various kinds of information. However, since each of the copyright management information R2 and the key information K2 has a capacity of at most about 256 kbits, they can be sufficiently recorded into the lead-in area LIN2. If the copyright management information R2 and the key information K2 are recorded into the lead-in area LIN2, there is no need to access the lead-out area LOUT2 and there is an advantage such that an accessing speed can be improved.

Further, as shown in FIG. 6C, the copyright management information R2 and the key information K2 can be also recorded into both of the lead-in area LIN2 and lead-out area LIN2.

Further, as shown in FIG. 6D, for example, it is also possible to construct in a manner such that the copyright management information R2 and the key information K2 of 256 kbits are divided into two copyright management information R2a and R2b and two key information K2a and K2b, the copyright management information R2a and the key information K2a are recorded into the lead-in area LIN2, and the copyright management information R2b and the key information K2b are recorded into the lead-out area LOU2, respectively. It is also possible to separately record the copyright management information R2 and the key information K2 into the lead-in area LIN2 and lead-out area LOU2, respectively.

In the above description, on the other hand, the contents data is encrypted and recorded into only the area AR2 in the outer rim between the two areas AR1 and AR2 on the disc. However, a case of encrypting and recording the contents data into both of the two areas AR1 and AR2 is presumed.

Figure 7A:
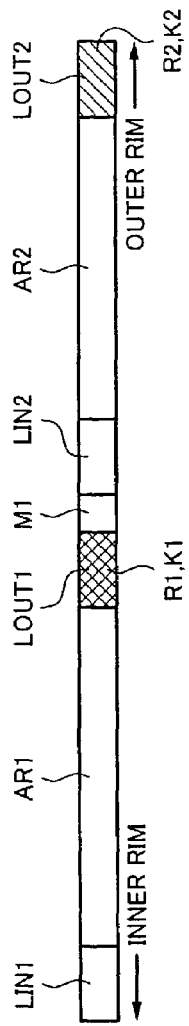
FIGS. 7A to 7D are schematic diagrams for use in explanation of the embodiment of the invention.

In such a case, as shown in FIG. 7A, copyright management information R1 and key information K1 for the contents data in the area AR1 are recorded into the lead-out area LOUT1. The copyright management information R2 and the key information K2 for the contents data in the area AR2 are recorded into the lead-out area LOUT2.

Figure 7B:
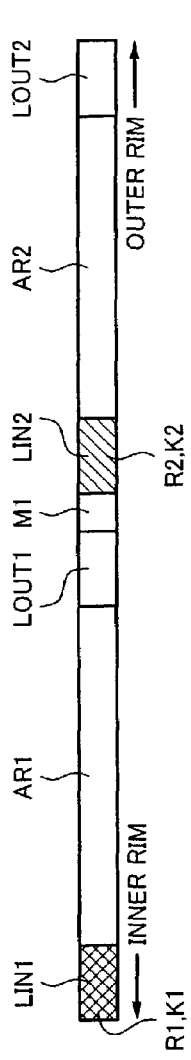

As shown in FIG. 7B, it is also possible to record the copyright management information R1 and the key information K1 for the contents data in the area AR1 into the lead-in area LIN1 and record the copyright management information R2 and the key information K2 for the contents data in the area AR2 into the lead-in area LIN2, respectively.

Figure 7C:
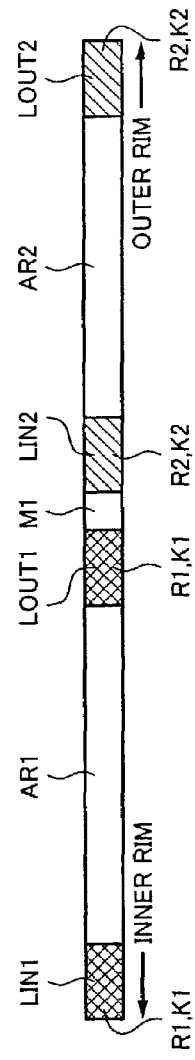

Further, as shown in FIG. 7C, it is also possible to record the copyright management information R1 and the key information K1 for the contents data in the area AR1 into both of the lead-in area LIN1 and the lead-out area LOUT1 and record the copyright management information R2 and the key information K2 for the area AR2 into both of the lead-in area LIN2 and the lead-out area LOUT2, respectively.

Figure 7D:
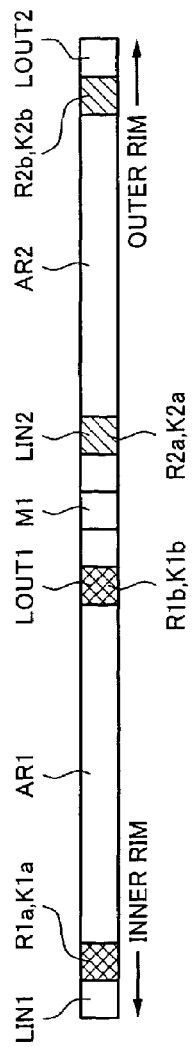

Further, as shown in FIG. 7D, for example, it is also possible to construct in a manner such that the copyright management information R1 and the key information K1 for the contents data in the area AR1 are divided into two copyright management information R1a and R1b and two key information K1a and K1b, they are recorded into the lead-in area LIN1 and lead-out area LOUT1, the copyright management information R2 and the key information K2 for the area AR2 are divided into the two copyright management information R2a and R2b and the two key information K2a and K2b, and they are recorded into the lead-in area LIN2 and lead-out area LOUT2, respectively. It is also possible to separately record the copyright management information R1 and the key information K1 and record the copyright management information R2 and the key information K2, respectively.

Further, although the above example has been described with respect to the case of recording the data onto the disc in which the recording area has been divided into two areas like CD2, the invention can be also applied to a case of further dividing the recording area into a plurality of areas. The invention can be also applied to a case of recording the data onto a disc in which the recording area is not divided like an ordinary CD or a double density CD as shown in FIG. 8.

Figure 9A:
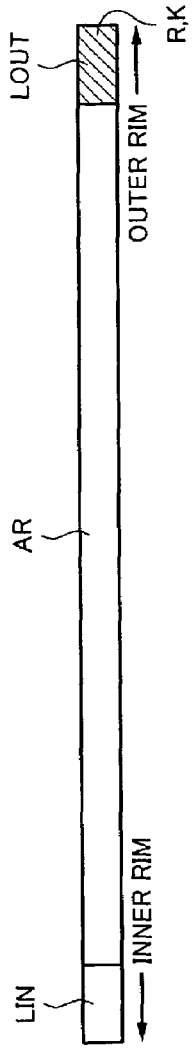
FIGS. 9A to 9D are schematic diagrams for use in explanation of the embodiment of the invention.

In case of a disc having one recording area, as shown in FIG. 9A, the copyright management information R and the key information K for the contents data in the area AR are recorded into the lead-out area LOUT.

Figure 9B:
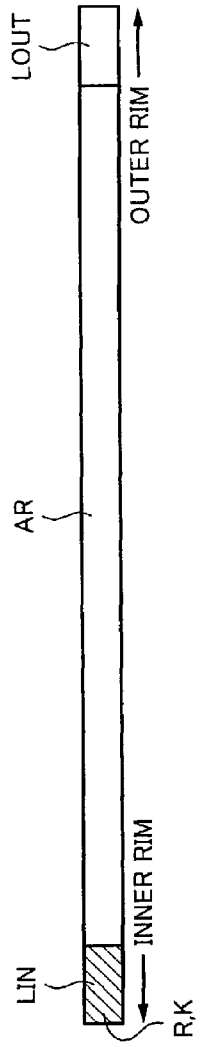

As shown in FIG. 9B, the copyright management information R and the key information K for the contents data in the area AR can be also recorded into the lead-in area LIN.

Figure 9C:
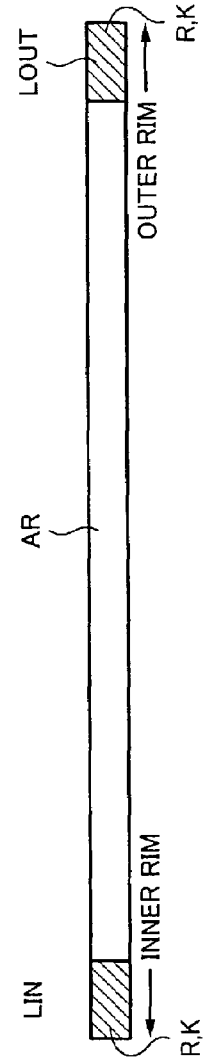

Further, as shown in FIG. 9C, the copyright management information R and the key information K for the contents data in the area AR can be also recorded into both of the lead-in area LIN and lead-out area LOUT.

Figure 9D:
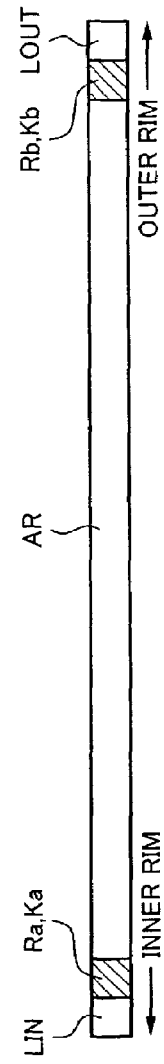

Further, as shown in FIG. 9D, the copyright management information R and the key information K for the contents data in the area AR can be also divided into two Ra and Rb and two Ka and Kb and recorded into the lead-in area LIN and lead-out area LOUT, respectively. It is also possible to separately record the copyright management information R and the key information K into the lead-in area LIN and lead-out area LOU, respectively.

According to the invention, when the encryption data is recorded into the data area of the memory medium having the data area, lead-in area, and lead-out area, the copyright management information and the key information for the encryption data are recorded into the lead-out area.

In case of the memory medium having a plurality of data areas, a plurality of lead-in areas, and a plurality of lead-out areas like CD2, when the encryption data is recorded into the data area, the copyright management information and the key information corresponding to the encryption data are recorded into one of the plurality of lead-in areas or one of the plurality of lead-out areas.

In the present situation, only information in the Q channel of the subcode has been recorded in the lead-out area and this area is filled with dummy data. The position of the lead-out is obtained from the information of the TOC. The fact that the light spot has entered the lead-out area can be judged from the information in the Q channel. The copyright management information and the key information are recorded by using such a lead-out area. The lead-out area is not rewritten or accessed by the ordinary CD player, so that the copyright management information and the key information can be safely held.

INDUSTRIAL APPLICABILITY

The invention is suitable for use in a case where when contents data is recorded/reproduced to/from the disc like CD2, the data is encrypted in order to protect the contents data.

The invention claimed is

1. A recording apparatus for recording data on a memory medium comprising a plurality of data areas for recording content data, a plurality of lead-in areas, and a plurality of lead-out areas, the recording apparatus comprising:
   an input terminal for inputting encrypted content data; and
   an optical pickup for,
      recording first encrypted content data into a first data area on said memory medium,
      recording a first part of a first decrypting key for decrypting said first encrypted content data and a first part of first copyright management information for restricting reproduction/copy of said first encrypted content data into a first lead-in area on an inner rim side of said first data area,
      recording a second part of the first decrypting key and a second part of the first copyright management information into a first lead-out area on an outer rim side of said first data area,
      recording second encrypted content data into a second data area on said memory medium,
      recording a first part of a second decrypting key for decrypting said second encrypted content data and a first part of second copyright management information for restricting reproduction/copy of said second encrypted content data into a first lead-in area on an inner rim side of said second data area, and
      recording a second part of the second decrypting key and a second part of the second copyright management information into a first lead-out area on an outer rim side of said second data area; wherein
   the data areas are positioned relative to one another on said memory medium in a radial direction.

2. A reproducing apparatus for reproducing data from a memory medium comprising a plurality of data areas for recording content data, a plurality of lead-in areas, and a plurality of lead-out areas, the reproducing apparatus comprising:
   an optical pickup for,
      reading out first encrypted content data from a first data area on said memory medium,
      reading out a first part of a first decrypting key for decrypting said encrypted content data and a first part of first copyright management information for restricting reproduction/copy of said encrypted content data from a first lead-in area on an inner rim side of said first data area,
      reading out a second part of the first decrypting key and a second part of the first copyright management information from a first lead-out area on an outer rim side of said first data area,
      reading out second encrypted content data from a second data area on said memory medium,
      reading out a first part of a second decrypting key for decrypting said second encrypted content data and a first part of second copyright management information for restricting reproduction/copy of said second encrypted content data from a first lead-in area on an inner rim side of said second data area, and
      reading out a second part of the second decrypting key and a second part of the second copyright management information from a first lead-out area on an outer rim side of said second data area; and
   a reproducing circuit for reproducing said first encrypted content data in accordance with said read-out first decrypting key and first copyright management information and for reproducing said second encrypted content data in accordance with said read-out second decrypting key and second copyright management information; wherein
   the plurality of data areas are positioned relative to one another on said memory medium in a radial direction.

3. A reproducing method for reproducing data from a memory medium comprising a plurality of data areas for recording content data, a plurality of lead-in areas, and a plurality of lead-out areas, the reproducing method comprising:
   reading out first encrypted content data from a first data area on the memory medium;
   reading out a first part of a first decrypting key for decrypting said first encrypted content data and a first part of first copyright management information for restricting reproduction/copy of said first encrypted content data from a first lead-in area on an inner rim side of said first data area;
   reading out a second part of the first decrypting key and a second part of the first copyright management information from a first lead-out area on an outer rim side of said first data area;
   reading out second encrypted content data from a second data area on the memory medium,
   reading out a first part of a second decrypting key for decrypting said second encrypted content data and a first part of second copyright management information for restricting reproduction/copy of said second encrypted content data from a first lead-in area on an inner rim side of said second data area,
   reading out a second part of the second decrypting key and a second part of the second copyright management information from a first lead-out area on an outer rim side of said second data area; and
   reproducing said first encrypted content data in accordance with the first decrypting key and first copyright management information read out from the first lead-in area and the second lead-out area and reproducing the second encrypted content data in accordance with the second decrypting key and second copyright management information read out from the second lead-in area and the second lead-out area; wherein
   the plurality of data areas are positioned relative to one another on said memory medium in a radial direction.

4. A recording apparatus according to claim 1, wherein the first copyright management information and the second copyright management information manage one or more of copy inhibition or permission, generation of the copy, restriction of the number of copies, reproduction inhibition or permission, restriction of the number of reproducing times, and a restriction of a reproducing time for the first encrypted content data and the second encrypted content data.

5. A reproducing apparatus according to claim 2, wherein the first copyright management information and the second copyright management information manage one or more of copy inhibition or permission, generation of the copy, restriction of the number of copies, reproduction inhibition or permission, restriction of the number of reproducing times, and a restriction of a reproducing time for the first encrypted content data and the second encrypted content data.

6. A reproducing method according to claim 3, wherein the first copyright management information and the second copyright management information manage one or more of copy inhibition or permission, generation of the copy, restriction of the number of copies, reproduction inhibition or permission, restriction of the number of reproducing times, and a restriction of a reproducing time for the first encrypted content data and the second encrypted content data.

* * * * *